May 31, 1932.　　　C. A. MOORE　　　1,860,782
INSULATED BUILDING

Filed April 29, 1931　　3 Sheets-Sheet 1

Inventor
Charles A. Moore

By Caswell + Lagaard
Attorneys

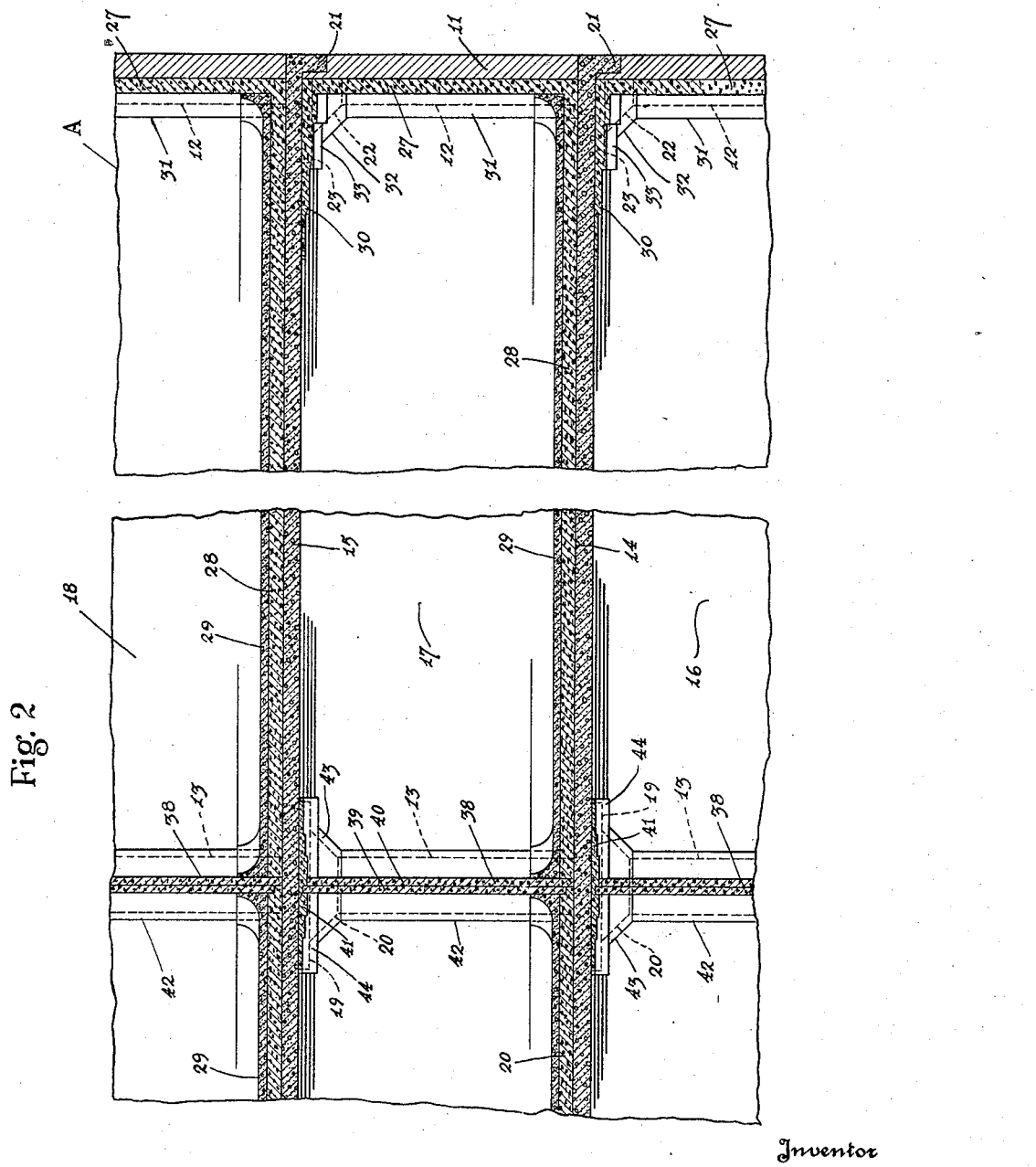

May 31, 1932.                C. A. MOORE                1,860,782
                          INSULATED BUILDING
                    Filed April 29, 1931    3 Sheets-Sheet 3
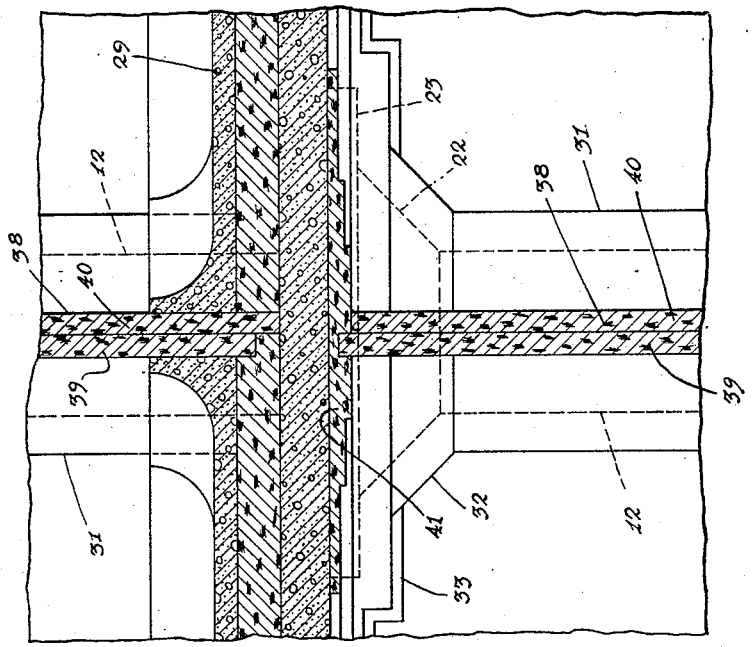
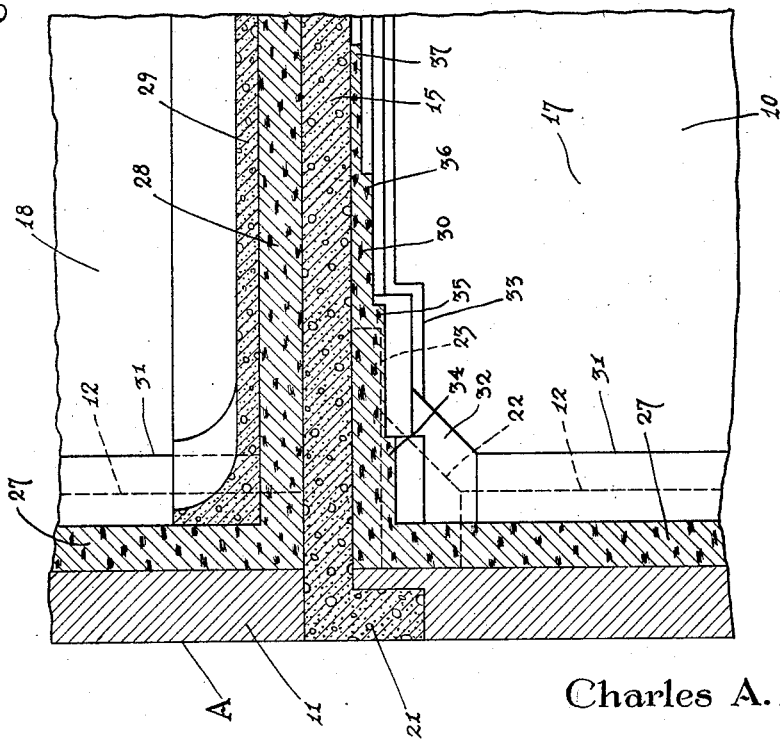
Inventor
Charles A. Moore
By Caswell & Lagaard
Attorneys Patented May 31, 1932

1,860,782

UNITED STATES PATENT OFFICE

CHARLES A. MOORE, OF EDINA, MINNESOTA

INSULATED BUILDING

Application filed April 29, 1931. Serial No. 533,619.

My invention relates to systems of insulation for buildings and has for its object to provide an economical system of insulation for buildings of the so-called monolithic and similar types.

Another object of the invention resides in providing a system of insulation in which the insulating properties of the floors, columns and inner partitions of the buildings are utilized.

An object of the invention resides in providing a system of insulation for buildings having portions therein in which each room is insulated from the other and from the exterior.

A still further object of the invention resides in providing an insulating lining for the outer enclosing parts of the building such as the outer walls and roof and in further providing ribbons of insulating material lying along the dividing parts of the building such as walls and partitions and along members extending inwardly from the enclosing parts such as columns, capitals, drop panels, beams and the like.

Another object of the invention resides in running said ribbons continuously from the wall lining of the building inwardly into the building and particularly on the undersides of the floors.

A still further object of the invention resides in constructing said ribbons of a thickness and width such that the conductivity of the floors or other parts to which the ribbons are applied in a direction at right angles to the walls or other enclosing part from which they issue shall be substantially equal to or not exceed the conductivity of the enclosing part and the insulation thereon.

An object of the invention resides in gradually reducing the thickness of the ribbons inwardly of the walls from which they issue.

Other objects of the invention reside in the novel combination and arrangement of parts and in details of construction hereinafter illustrated and/or described.

In the drawings:

Fig. 2 is an elevational, sectional view taken on line 2—2 of Fig. 1.

Fig. 3 is an elevational sectional view of the building taken on line 3—3 of Fig. 1.

Figure 1:
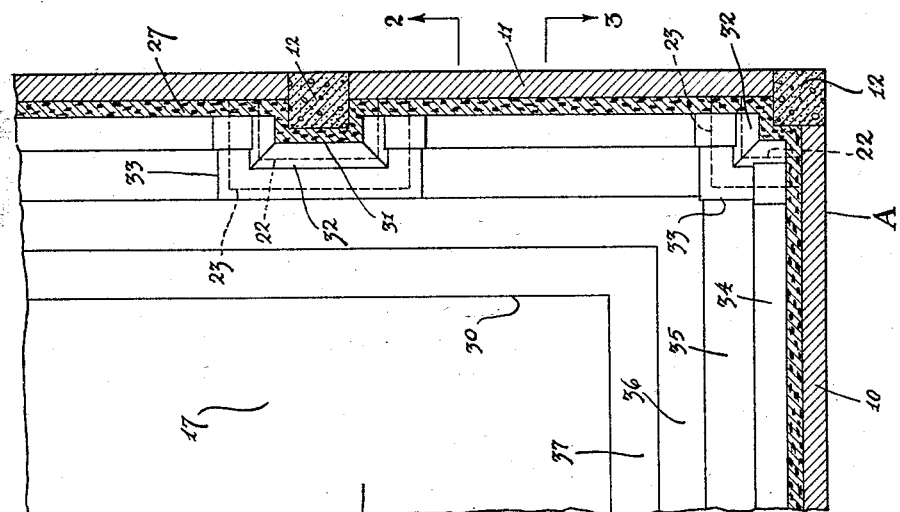
Fig. 1 is a fragmentary plan view of a building illustrating an embodiment of my invention.
Figure 1:
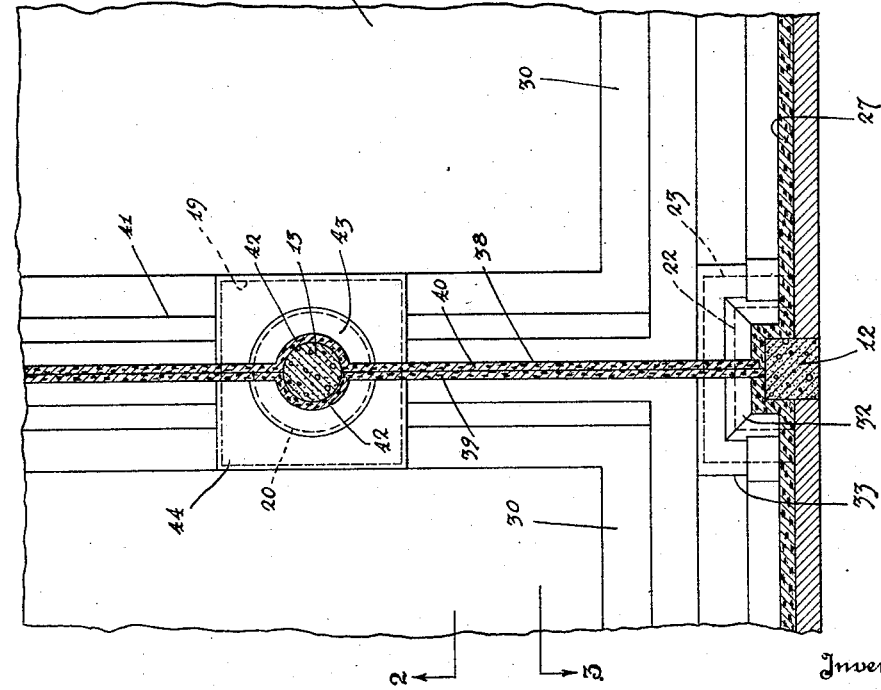

In the insulation of cold storage plants and similar buildings, the common practice has been to employ what it known in the art as the envelope type of building. In such construction the outer walls of the building are spaced from the building proper and insulation of proper character and thickness disposed between the outer wall and the building. Such methods of insulation require special building construction and are not adaptable to the insulation of existing buildings of other types. In addition, leakage of air between parts of the building adjoining the outer walls, frequently occurs so that complete isolation of the stories or rooms of the building is not always possible. Such buildings furthermore are not as readily adaptable to the installation of the most modern ventilating, refrigerating and air temperating systems and equipments. The present invention provides an insulating system which may be applied to existing buildings, such as buildings of monolithic concrete construction or buildings similar thereto and in which any type of equipment or any kind of system may be used.

For the purpose of illustrating the application of my invention, I have shown in the drawings, a monolithic building of the so-called flat slab type. Only so much of such building has been shown as will be necessary to illustrate the application of the invention thereto, though it will be understood from the following description that the invention may be applied to either partially insulate the building or to completely insulate the same and that the invention may be employed with a building of any size or number of stories. The building shown is indicated in its entirety by the letter A and includes suitable footings which carry outer walls 10 and 11 and outer columns 12. Other footings disposed within the interior of the building carry interior columns 13, which in conjunction with the columns 12 support a number of floors 14 and 15 and a roof (not shown). These floors divide the building into a number of stories 16, 17 and 18.

The floors 14 and 15 and the roof of the building shown, as stated, are built of reinforced concrete and are of flat slab construction. These floors are provided with drop panels 19 supported on suitable column capitals 20 carried by the columns 12 and 13. The floors 14 and 15 are supported at their marginal portions through beams 21 which are carried by the columns 12 disposed in the outer walls of the building. The columns 12 may be constructed with column capitals 22, similar to the capitals 20 and the floors 14 and 15 may be constructed with drop panels 23 corresponding to the drop panels 19 and superimposing the capitals in 22.

The building disclosed in this application being selected merely for the purpose of illustration, the construction thereof has not been shown in detail. The building may, as stated, be formed of reinforced concrete of the flat slab or joist and girder type or may be made of structural steel with proper types of floors and walls. The walls may be constructed of brick, tile, concrete or other suitable building materials and the floors may be likewise constructed in any suitable manner. In the drawings, the location of doors, windows, stairs and elevators has not been shown, though it can readily be comprehended that such structures are contemplated and may be situated wherever desired, the specific location thereof having no particular bearing upon the invention.

In the insulation of buildings in accordance with my invention, the insulating qualities of the concrete or other materials from which the building is constructed is utilized. It is a well known fact that a substance of lesser insulating qualities, if made thick enough, will have the same resistance to the passage of heat as a thinner substance having greater insulating qualities. In approximate terms, one foot of concrete is equivalent to one inch of cork as used in the insulation of buildings. With my system, the insulation is so arranged that the resistance to the passage of heat through the building is substantially the same along all the various paths along which heat may travel. To economize on material, the insulation is reduced in thickness at certain localities and the inslulation completely omitted at other localities. The particular arrangement of the insulation will now be described in detail.

In the insulation of the building, in accordance with my invention, each story is separately insulated. With the exception of the upper story, all of the stories of the building are insulated in the same manner. For this reason only the insulation in story 17 will be described in detail. In the story 17 an insulating lining 27 is employed which is applied to the inner surfaces of all of the outer walls 10 and 11 of the building and which extends between the two floors 14 and 15. This lining extends about the various columns 12 in the outer walls 10 and 11 as indicated at 31 and also about the column capitals as designated at 32. The thickness of the insulation depends upon the rate of heat exchange permissible. In the particular installation illustrated, it has been assumed that a degree of insulation is required equivalent to nine inches of cork. In case the walls 10 and 11 were one foot thick, the lining 27 would be eight inches thick. This thickness would also be employed for the portions 31 and 32 of the lining extending about the columns and column capitals. In addition, a lining 28 is employed which is placed upon the floor 14 and which extends from one wall of the building to the other and encircles the various columns 13. This lining is preferably of the same thickness as the lining 27. The lining 28 rests directly upon the surface of the floor 14 and may be covered with a paving or other floor surfacing, such as indicated at 29, which protects the insulation and provides a surface over which trucks may be run and on which the produce stored may be placed.

In addition to the linings on the floor and outer walls of the building, ribbons of insulation, which I have indicated at 30 are employed, which are attached to the ceiling of the floor and which extend inwardly into the room from the outer walls 10 and 11 thereof. These ribbons underlie the drop panels 23 of the columns 12 as illustrated at 33 and extend completely about the outer walls of the building. The ribbons 30 are stepped as best shown in Fig. 3 to provide sections 34, 35, 36 and 37 of decreasing thickness. The total width of the ribbon 30 is such that the resistance to the passage of heat through the concrete floor from the exterior of the building to the edge of the ribbon or vice versa is equivalent to the resistance to the passage of heat through the wall and the insulation thereon. On the assumption that the wall is one foot and the lining 27 is eight inches, the total insulation of the wall would be equal to nine inches of cork or nine feet of concrete. In such case, the distance from the outer wall to the edge of the ribbon 30 would be nine feet, making the ribbon eight feet wide. At the juncture of the ribbon 30 with the insulation lining 27, the thickness of the ribbon should be equal to that of the lining 27, the ribbon gradually decreasing in thickness to zero at the inner edge. For constructional reasons, the lining is stepped and divided into the sections 34, 35, 36 and 37 as previously brought out so that the cork, which is arranged in layers of material two inches thick may be easily and conveniently erected. Where the cork insulation material is two inches thick, the thickness of the section 37 would be two inches and the width of this section would be two feet. Likewise, the added thickness to the section 36 would be two inches and its width two feet. The combined thickness of this section would hence be four inches. The section 35 would similarly be six inches thick and two feet wide, while the section 34 would be the full eight inches in thickness and two feet wide, including the thickness of the lining 27. With the insulating ribbon 30 stepped as illustrated, the resistance to the passage of heat from the exterior of the building to the interior or vice versa is substantially equivalent to that of the insulated lining 27 and the wall 10 or 11 regardless of the path of travel of the heat from the interior to the exterior or vice versa.

Wherever desired, my invention may be employed to provide rooms in the building insulated from one another and from the remainder of the building. In the construction of such rooms, walls are employed, one such wall being indicated at 38. This wall may be constructed of insulating material such as cork or the like, or the same may be constructed of other materials and provided with insulated linings the same as the outer walls of the building. When constructed of insulating material, the wall 38 is formed in two sections, 39 and 40, of a combined thickness sufficient to give the desired insulation. The wall 38 is brought down to the insulated lining 28 on the floor proper and is preferably rabbeted into said lining to form a tight joint therebetween. If desired, the ends of the two sections 39 and 40 may offset to form a staggered joint so as to further prevent passage of air through the joint.

In conjunction with the wall 38, a ribbon 41 is employed which is applied to the ceiling of the floor above the room to be insulated and which is situated centrally with respect to the wall 38 and projecting outwardly from said wall on either side thereof. This ribbon is of a width in feet substantially equal to the thickness of the wall 38 in inches and may be stepped in identically the same manner as the ribbon 30. About the columns 13 are placed insulating linings 42 which are of a thickness equal to that of one of the sections 39 or 40 of wall 38. In addition insulation is disposed about the column capitals 20 as designated at 43 and also beneath the drop panels 19 as designated at 44. In any case, the width of the portion 44 of the lining does not exceed that of the ribbon 41. The wall 38 may be rabbeted into the ribbon 41 the same as in the lining 28, the joints for the two sections thereof being broken to effect a tight seal therebetween. The wall 38 in the formation of the various rooms within the building may be run in any direction from one wall of the building to the other and as many walls as required be employed to provide the necessary division of the building space. When the walls are constructed as described, the rooms or compartments formed thereby are completely insulated from one another and from the remainder of the building as well as from the exterior so that any desired temperature may be maintained within the same.

The advantages of my invention are manifest. The system may be used with any type of building and particularly to buildings not specially designed for cold storage. With a building insulated in accordance with my invention, leakage of air from one story to the other is entirely prevented so that absolute control of the circulation of air and the temperature and humidity thereof can be had. The insulation may be installed in the building during the construction thereof or at any time subsequent thereto. The cost of insulation of buildings in accordance with my invention will not appreciable exceed that of buildings of the so called envelope type.

Changes in the specific form of my invention as herein disclosed may be made within the scope of what is claimed, without departing from the spirit of my invention.

Having described my invention, what I claim as new and desire to protect by Letters Patent is:

1. In a building of monolithic construction having an outer wall and an intermediate floor joining the same, a lining of insulating material having a smaller coefficient of heat conduction than said floor, said lining covering said wall on the inner surface thereof, both below and above said floor and extending along said floor both on the upper and lower surfaces thereof inwardly from the outer wall a distance along one surface thereof such that the quotient of the coefficient of heat conduction of said floor and the width of the lined portion thereof shall not exceed the quotient of the coefficient of heat conduction of said lining and its thickness.

2. In a building of monolithic construction having an outer wall and an intermediate floor joining the same, a lining of insulating material covering said wall on the inner surface thereof, both below and above said floor and extending along said floor both on the upper and lower surfaces thereof and extending inwardly from the outer wall on one side of said floor a distance such that the conductivity of the floor horizontally across the lined portion thereof, shall not exceed the conductivity of the lining directly through the same.

3. In a building of monolithic construction, having an outer wall and an intermediate floor adjoining the same, a lining of insulating material covering said wall on the interior surface thereof, both above and below said floor, and extending along said floor both on the upper and lower surfaces thereof, inwardly from the outer wall a distance greater than the combined thickness of the wall and lining.

4. In a building having enclosing parts such as walls and a ceiling and dividing parts such as floors and partitions, a lining of insulating material covering one of said enclosing parts on either side of a dividing part joining the same, insulating means disposed on one side of said dividing part and extending up to said lining and a ribbon of insulating material disposed on the other side of said dividing part adjacent said insulating lining and extending inwardly into the building from the enclosing part.

5. In a building of monolithic construction having an outer wall and an intermediate floor joining the same, a lining of insulating material covering said wall on the inner surfaces thereof both below and above said floor, insulating means disposed upon said floor upon the upper side thereof and extending up to said lining and a ribbon of insulating material disposed upon the under side of said floor and joining said insulating lining, said ribbon extending inwardly from the outer wall toward the interior of the building.

6. In a building having a wall and a floor joining said wall, a lining of insulating material covering said wall below said floor, a lining of insulating material overlying said floor and extending up to said wall and a ribbon of insulating material extending along said wall and upon the underside of said floor from said insulating lining away from said wall.

7. In a building having a wall and a floor joining said wall, a lining of insulating material covering said wall below said floor, a lining overlying said floor and extending up to said wall and a ribbon of insulating material extending along said wall and upon the underside of said floor from said insulating lining away from said wall, said ribbon being of a thickness at its edge farthest from said wall less than at the adjoining edge thereof.

8. In an insulated room structure formed between and including adjacent floors of a building, an insulated partition extending from one floor to the other, a lining of insulating material overlying the upper floor, a similar lining overlying the lower floor, and a ribbon of insulating material lining the underside of the upper floor along the partition, said ribbon, in width, being co-extensive with an extent of said upper floor, the insulating capacity of which, in the direction of said extent, is substantially equal to the insulating capacity of said partition through the same.

9. In an insulated room structure formed between and including adjacent floors of a building, an insulated partition extending from one floor to the other, one floor being lined with insulating material at the side thereof within the room, the other floor being lined with similar material at the side thereof without the room, and a ribbon of insulating material lining the side of said latter floor within the room and along said partition, said ribbon, in width, being co-extensive with an extent of said latter floor, the insulating capacity of which, in the direction of said extent, is substantially equal to the insulating capacity of said partition through the same.

10. In a building having a wall and a floor joining said wall, a lining of insulating material covering said wall below said floor, a lining of insulating material overlying said floor, and a ribbon of insulating material underlying said floor and extending along said wall, said ribbon being stepped down in thickness from said wall inwardly therefrom.

11. In a building having a wall and a floor joining said wall, a lining of insulating material covering said wall below said floor, a lining of insulating material overlying said floor and a ribbon of insulating material underlying said floor and extending along said wall, the insulating capacity of said floor through the extent thereof co-extensive with the width of said ribbon being substantially equal to the insulating capacity of said wall lining through its thickness.

12. In a building having a wall and a floor joining said wall, a lining of insulating material covering said wall below said floor, a lining of insulating material overlying said floor, and a ribbon of insulating material underlying said floor and extending along said wall, the aggregate insulating capacity of said ribbon and floor, through the thickness of the former at any point and then through the latter to the wall being substantially equal to the insulating capacity of said wall lining through its thickness.

13. In a room enclosing structure, a wall member, a floor member issuing from the wall member between upper and lower portions thereof, one portion of the wall member forming a part of the room and the floor member constituting another part of the room, an insulating lining applied to one side of the wall member and covering that portion thereof forming a part of said room, a second insulating lining similar to said first lining applied to one side of the floor member and covering the same, a third insulating lining member of limited width applied to the structure at the junction of the wall member and floor member, the disposition, lateral extent and thickness of said last lining member being such that the capacity of said structure for the transmission of heat from the outside into the room and from the room to the outside, through said junction, is no greater than the heat transmitting capacity of either of said structure members and its lining directly through the same.

In testimony whereof I have affixed my signature.

CHARLES A. MOORE.